United States Patent Office 3,814,806
Patented June 4, 1974

---

3,814,806
INSECTICIDAL COMPOSITIONS AND METHODS EMPLOYING TRIFLUOROMETHYL SUBSTITUTED BENZANILIDES
Paul J. Stoffel, Creve Coeur, Mo., assignor to Monsanto Company, St. Louis, Mo.
No Drawing. Application Dec. 23, 1971, Ser. No. 211,715, now Patent No. 3,746,762, which is a continuation-in-part of abandoned application Ser. No. 57,789, July 23, 1970. Divided and this application Dec. 18, 1972, Ser. No. 316,162
Int. Cl. A01n 9/20
U.S. Cl. 424—324       14 Claims

ABSTRACT OF THE DISCLOSURE

Compounds of the formula

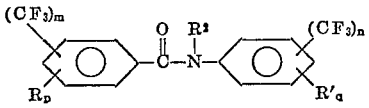

wherein $m$ and $n$ are integers from 1 to 2, inclusive, $p$ and $q$ are integers from 0 to 2, inclusive, R and R' are halo or nitro, and $R^2$ is hydrogen or formyl. These compounds are useful as insecticides.

---

This is a division of application Serial No. 211,715, filed December 23, 1971, now U.S. Patent 3,746,762, which is a continuation-in-part of copending application Ser. No. 57,789, now abandoned.

This invention relates to novel chemical compounds having insecticidal properties and to their applications as insecticides. More particularly, the invention is directed to a series of trifluoromethyl substituted benzanilides; methods in which they are used to control insects; and to insecticidal compositions wherein said benzanilides serve as the active agents.

The novel compounds of this invention may be graphically represented by the formula

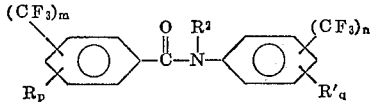

wherein $m$ and $n$ are integers from 1 to 2, inclusive $p$ and $q$ are integers from 0 to 2, inclusive, R and R' are halo or nitro, and $R^2$ is hydrogen or formyl.

In general, these compounds may be prepared by merely bringing together in an inert organic solvent at ambient temperatures substantially equimolecular proportions of an appropriately substituted aniline and benzoic acid or the acid chloride derivative thereof. The reaction is usually exothermic and requires cooling means to keep the temperature at or below 50° C. In some insatnces, such as in the case where one or both of the reactants contains a nitro substitution, the reaction is not exothermic and is conducted at reflux temperatures.

In illustration of specific preparations of the novel benzanilides of this invention but not in limitation thereof, the following examples are presented. All parts are by weight unless otherwise indicated.

EXAMPLE I 3,3′-di-trifluoromethyl-N-formylbenzanilide

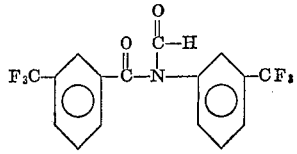

To 50 parts of triethylamine there was added and dissolved therein 15.13 parts (0.08 mol.) of m-trifluoromethylformanilide. To this solution, there was then slowly added with stirring 16.60 parts (0.08 mol.) of m-trifluoromethylbenzoyl chloride. During this latter addition and the resulting reaction, the reaction medium was maintained at a temperature below about 20° C. by means of an ice bath. Following the exothermic reaction, the slurry obtained was stirred at room temperature for approximately 90 minutes and then placed in 100 parts of water where a brown oil-like substance formed. This substance was extracted twice with 75 parts of ether and the extract washed with 100 parts of a 6% hydrochloric acid solution. The organic layer was then isolated, stripped of solvent and dried with calcium chloride. Upon standing the liquid product changed to a solid material. Recrystallization from a methanol-water mixture yielded 13.0 parts of a golden-brown product melting at between 103°–107° C.

Analysis for $C_{16}H_9F_6NO_2$ (mol. wt. 361.2) was as follows: Calc'd: C, 53.40; H, 2.50; F, 31.56. Found: C, 53.21; H, 2.71; F, 31.43.

EXAMPLE II 3,3′-di-trifluoromethylbenzanilide

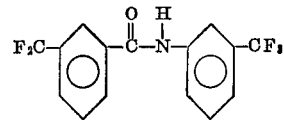

To 60 parts of triethylamine there was added and dissolved therein 16.1 parts (0.1 mol.) of m-trifluoromethyl aniline. To this solution, there was then slowly added with stirring 20.9 parts (0.1 mol.) of m-trifluoromethyl benzoyl chloride. During this latter addition and the resulting reaction, the reaction medium was held at about 50° C. by employing an ice bath. Following the exothermic reaction, the resulting product was stirred at room temperature for approximately 30 minutes and then placed in 100 parts of water with stirring. The solids formed were filtered and washed three times in 50 parts of water. On recrystallization from a mixture of 75 parts methanol and 10 parts water, 24 parts of a white solid melting at 123°–124° C. was obtained.

Analysis for $C_{15}H_9F_6NO_2$ (mol wt. 333.2) was as follows: Calc'd: C, 54.15; H, 2.70; N, 4.23. Found: C, 54.39; H, 2.79; N, 3.96.

EXAMPLE III 3,3′-di-trifluoromethyl-4′-chlorobenzanilide

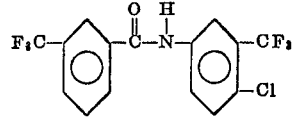

To 50 parts of triethylamine there was added and dissolved therein 19.6 parts (0.1 mol.) of 4-chloro-3-trifluoromethylaniline. There was then added 20.9 parts (0.1 mol.) of m-trifluoromethylbenzoyl chloride. During the latter addition and ensuing reaction, the reaction medium was maintained at about 50° C. by employing an ice bath. Following the exothermic reaction, the product was stirred at room temperature for about 30 minutes and thereafter placed in 100 parts of water. The solid product was recovered by filtration and thereafter recrystallized twice in a methanol-water mixture to yield 28 parts of a white granular product melting at 125° to 126° C. The yield was 76.4 percent.

Analysis for $C_{15}H_8ClF_6NO$ (mol. wt. 367.7) was as follows: Calc'd: C, 49.00; H, 2.17; N, 3.80. Found: C, 49.31; H, 2.26; N, 3.69.

EXAMPLE IV 3,3'-di-trifluoromethyl-4'-nitrobenzanilide

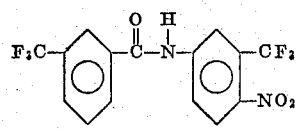

To 60 parts of triethylamine there was added and dissolved therein 20.6 parts (0.1 mol.) of 4-nitro-3-trifluoromethyl aniline. To this solution there was then slowly added with stirring 20.9 parts (0.1 mol.) of m-trifluoromethyl benzoyl chloride. This reaction was not exothermic and was brought about by gradually heating to reflux temperatures for approximately two hours after which the slurry formed by reaction passed into a yellow brown solution. After washing with 50 parts of water three times, a brown solid was obtained. Recrystallization with 40 parts of methanol yielded 25 parts of a yellow granular product melting at between 158° and 159° C. The product yield was 66.3 percent and had the following analysis.

Analysis for $C_{15}H_8F_6N_2O_3$ (mol. wt. 378.1) was as follows: Calc'd: C, 47.75; H, 2.11; N, 7.44. Found: C, 47.63; H, 2.22; N, 7.37.

The following representative compounds of the present invention are obtained in similar manner:

3,3'-di-trifluoromethyl-4'-fluorobenzanilide
2,2'-di-trifluoromethyl-4-iodobenzanilide
4,4'-trifluoromethyl-3,3'-dibromobenzanilide
2,2'-di-trifluoromethylbenzanilide
3,3'-di-trifluoromethyl-4'-nitrobenzanilide
3,3'-di-trifluoromethyl-4-chloro-4'-fluorobenzanilide
3,3'-di-trifluoromethyl-4,4'-dinitrobenzanilide
3,3'-di-trifluoromethyl-4-nitrobenzanilide
3,3'-di-trifluoromethyl-4-nitro-4'-chlorobenzanilide The terms "insect" and "insecticide" are used herein in their broad common usage to include spiders, mites, ticks, and like pests which are not in the strict biological sense classed as insects. Thus, the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, and wood lice.

The effectiveness of the compounds against the yellow fever mosquito (*Aedes egypti*) is illustrated by a standard life cycle test utilizing aqueous acetone solutions of the insecticides. At concentrations of 2 p.p.m., 100 percent mortality rates were observed with the following compounds of this invention:

3,3'-di-trifluoromethyl-N-formylbenzanilide,
3,3'-di-trifluoromethylbenzanilide,
3,3'-di-trifluoromethyl-4'-chlorobenzanilide and
3,3'-di-trifluoromethyl-4'-nitrobenzanilide In addition, when using 3,3'-di-trifluoromethyl-N-formylbenzanilide and also 3,3'-di-trifluoromethylbenzanilide, no oviposition was observed at a concentration of 0.2 p.p.m.

The activity of compounds of this invention against the corn rootworm is illustrated by the following:

To a growth pouch (diSPo Seed-Pak growth pouch, Catalogue No. B1220, of Scientific Products Division of American Hospital Supply Corporation, Evanston, Ill.) in an upright position is added 20 ml. of distilled water. Thereafter is added 0.1 ml. of an acetone solution of known concentration in percent by weight of a compound of this invention (for example an 0.1 ml. of an 0.1% by weight acetone solution of the compound provides a concentration of 5.0 p.p.m. thereof while 0.1 ml. of an 0.02% by weight acetone solution of the said compound provides a concentration of 1.0 p.p.m. thereof). In the trough of the pouch formed by the paper wick thereof are placed two corn seeds (*Zea mays*, Hybrid U.S. 13) about one inch apart. Thereupon to the trough and between the seeds are added 8 to 12 ready-to-hatch eggs of the southern corn rootworm (*Diabrotica undecimpunctata howardi*), which eggs were washed (with distilled water) free of the soil in which they were incubated at room temperature for 3 days immediately prior to their placement in the trough. The so charged growth pouch is then placed in an upright position in an incubator maintained at 80° F. and 70% relative humidity for 14 days. Immediately thereafter the growth pouches are removed and the extent of kill in percent of the particular species of corn rootworm larvae observed. At a concentration of 5 p.p.m. a 100 percent kill was obtained with 3,3'-di-trifluoromethylbenzanilide.

Although the compounds of this invention are useful per se in controlling a wide variety of insect pests, it is preferable that they be supplied to the pests or to the environment of the pests in a dispersed form in a suitable extending agent.

The term "dispersed" is used herein in its widest possible sense. When it is said that the compounds of this invention are dispersed, it means that particles of the compounds may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the compounds of this invention in a carrier such as dichloro-difluoromethane and the like fluorochloroalkanes which boil below room temperature at atmospheric pressure.

The expression "extending agent" as used herein includes insecticidal adjuvants and any and all of the substances in which the compounds of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the compounds of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the active compound employed to supply the desired dosage generally will be in the range of 0.0001 to 95 percent by weight. When the extending agent is a semi-solid or solid, the concentration of the compound employed to supply the desired dosage generally will be in the range of 0.1 to 80 percent by weight. From a practical point of view, the manufacturer must supply the user with a concentrate in such form that, by merely mixing with water of solid extender (e.g. powdered clay or talc) or other low-cost material available to the user at the point of use, he will have an easily prepared insecticidal spray or particulate solid. In such a concentrate composition, the compound generally will be present in a concentration of 5 to 95 percent by weight, the residue being any one or more of the well-known insecticidal adjuvants, such as the various surface active agents (e.g. detergents, a soap or other emulsifying or wetting agent), surface-active clays, solvents, diluents, carrier media, adhesives, spreading agents, humectants, and the like.

The compounds of this invention are preferably supplied to the insect pests or to the environment of the insect pests in the form of emulsions or suspensions. Emulsions or suspensions are prepared by dispersing the compounds either per se or in the form of an organic solution thereof in water with the aid of a water-soluble surfactant. The term "surfactant" as employed herein is used as in volume II of Schwartz, Perry and Berch's "Surface Active Agents and Detergents" (1958, Interscience Publishers Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary-active substances which may be anionic, cationic, or non-ionic which are described in detail in volumes I and II of Schwartz, Perry and Berch's "Surface Active Agents and Detergents" (1958), Interscience Publishers, Inc., New York) and also in the November 1947 issue of Chemical Industries (pages 811–824) in an article entitled "Synthetic Detergents" by John W. McCutcheon and also in the July, August, September, and October 1952 issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water-soluble anionic non-ionic surface-active agents set forth in U.S. 2,846,398 (issued Aug. 5, 1958). In general, a mixture of water-soluble anionic and water-soluble non-ionic surfactants is preferred.

The compounds of this invention can be dispersed by suitable methods (e.g. tumbling or grinding) in solid extending agents either of organic or inorganic nature and supplied to the insect pests' environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials as well as organic materials such as powdered cork, powdered wood, and powdered walnut shells. The preferred solid carriers are the adsorbent clays, e.g. bentonite. These mixtures can be used for insecticidal purposes in the dry form, or by addition of water-soluble surfactants or wetting agents, the dry particulate solids can be rendered wettable by water so as to obtain stable aqueous dispersions or suspensions suitable for use as sprays.

For special purposes the compounds of this invention can be dispersed in a semi-solid extending agent such as petroleum or soap (e.g. sodium stearate or oleate or palmitate or mixtures thereof) with or without the aid of solubility promoters and/or surfactants or dispersing agents.

In all of the forms described above the dispersions can be provided ready for use in combatting insects pests or they can be provided in a concentrated form suitable for mixing with or dispersing in other extending agents. As illustrative of a particularly useful concentrate is an intimate mixture of a compound of this invention with a water-soluble surfactant in the weight proportions of 0.1 to 15 parts of surfactant with sufficient benzanilide to make 100 parts by weight. Such a concentrate is particularly adapted to be made into a spray for combatting various forms of insect pests by the addition of water thereto.

Another useful concentrate adapted to be made into a spray for combatting a variety of insect pests is a solution (preferably as concentrated as possible) of a compound of this invention in an organic solvent therefor. The said liquid concentrate preferably contains dissolved therein a minor amount (e.g. 0.5 to 10 percent by weight of the weight of the new insecticidal agent) of a water-soluble surfactant (or emulsifying agent).

Emulsifiable concentrates of this general type are particularly well adapted for use as sheep and cattle dips in the control of animal parasites. In preparing such dips, a compound of this invention is dissolved in a water-immiscible solvent system and a sufficient quantity of one or more emulsifying agents is added to insure the formation of a stable aqueous emulsion. Water is then added to the concentrate to form an emulsion containing from about 0.01% to about 0.5% of the active ingredient.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkyaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides (e.g. sorbitan). These materials in general contain 15 to 30 moles of ethylene oxide per mole of the hexitol anhydride or the alkylphenol.

The compositions of this invention can also contain other additaments such as fertilizers and pesticides used as, or in combination with, the carrier materials. For example, the pesticides listed in U.S. Pat. 3,393,990 starting at line 68, column 7 and extending through line 71 of column 8, can be used in combination with the above-described compounds.

In controlling or combating insect pests the compounds of this invention either per se or compositions containing them are supplied to the insect pests or to their environment in a lethal or toxic amount. This can be done by dispersing the new insecticidal agent or insecticidal composition comprising same in, on or over an infested environment or in, on or over an environment the insect pests frequent, e.g. agricultural solid or other growth media or other media infested with insect pests or attractable to the pests for habitational or sustenance of propagational purposes, in any conventional fashion which permits contact between the insect pests and the compounds of this invention. Such dispersing can be brought about by applying spray, dips or particulate solid compositions to a surface infested with insect pests or attractable to the pests as for example, animals such as sheep and cattle, the surface of an agricultural soil or other media such as the above ground surface of plants by any of the conventional methods, e.g. power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish subsurface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. A method of controlling insects which comprises exposing said insects to an insecticidally effective amount of a compound of the formula

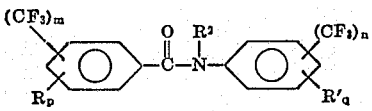

wherein *m* and *n* are integers from 1 to 2, inclusive, *p* and *q* are integers from 0 to 2, includesive R and R' are halo or nitro, and R² is hydrogen or formyl.

2. A method in accordance with claim 1 in which *m* and *n* are both 1.

3. A method in accordance with claim 1 in which R² is hydrogen.

4. A method in accordance with claim 1 in which R² is formyl.

5. A method in accordance with claim 1 in which the compound is 3,3'-di-trifluoromethylbenzanilide.

6. A method in accordance with claim 1 in which the compound is 3,3'-di-trifluoromethyl-4'-nitrobenzanilide.

7. A method in accordance with claim 1 in which the compound is 3,3'-di-trifluoromethyl-N-formylbenzanilide.

8. A method in accordance with claim 1 in which the compound is 3,3'-di-trifluoromethyl-4'-chlorobenzanilide.

9. An insecticidal composition comprising an inert insecticidal adjuvant and insecticidally effective amount of a compound selected from the group consisting of 3,3'-di-trifluoromethyl-4'-fluorobenzanilide, 2,2'-di-trifluoromethyl-4-iodobenzanilide, 4,4'-trifluoromethyl-3,3'-di-bromobenzanilide, 2,2'-di-trifluoromethylbenzanilide, 3,3'-di-trifluoromethyl-4-chloro-4'-fluorobenzanilide, 3,3'-di-trifluoromethyl-4,4'-dinitrobenzanilide, 3,3'-di-trifluoromethyl-4-nitrobenzanilide, 3,3'-di-trifluoromethyl-4-nitro-4'-chlorobenzanilide, 3,3'-di-trifluoromethylbenzanilide, 3,3'-di-trifluoromethyl-4'-chlorobenzanilide and a compound of the formula

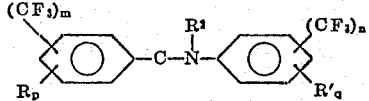

wherein *m* and *n* are integers from 1 to 2, inclusive, *p* and *q* are integers from 0 to 2, inclusive, R and R' are halo or nitro, and R² is formyl.

10. An insecticidal composition in accordance with claim 9 in which *m* and *n* are both 1.

11. An insecticidal composition in accordance with claim 9 in which the compound is 3,3'-di-trifluoromethylbenzanilide.

12. An insecticidal composition in accordance with claim 9 in which the compound is 3,3'-di-trifluoromethyl-4'-nitrobenzanilide.

13. An insecticidal composition in accordance with claim 9 in which the compound is 3,3'-di-trifluoromethyl-N-formylbenzanilide.

14. An insecticidal composition in accordance with claim 9 in which the compound is 3,3'-di-trifluoromethyl-4'-chlorobenzanilide.

References Cited
UNITED STATES PATENTS 3,689,556   9/1972   Welch et al.   424—324

OTHER REFERENCES

Welch et al.: J. Med. Chem., vol. 12 (1969), pp. 957–959.

SAM ROSEN, Primary Examiner